United States Patent [19]

Burton et al.

[11] Patent Number: 5,040,862

[45] Date of Patent: Aug. 20, 1991

[54] METHOD OF TRIMMING OPTICAL POWER

[75] Inventors: Clement D. Burton, Elmira; Jeffery A. DeMeritt, Painted Post; Douglas W. Hall, Corning, all of N.Y.

[73] Assignee: Corning Incorporated, Corning, N.Y.

[21] Appl. No.: 519,907

[22] Filed: May 7, 1990

[51] Int. Cl.$^5$ .............................................. G02B 6/36
[52] U.S. Cl. ........................................ 385/33; 385/53
[58] Field of Search ................. 350/96.2, 96.15, 96.18; 357/74

[56] References Cited

U.S. PATENT DOCUMENTS

| 4,529,262 | 7/1985 | Ashkin et al. | 350/96.15 |
| 4,616,899 | 10/1986 | Schlafer | 350/96.18 |
| 4,747,657 | 5/1988 | Chaoui et al. | 350/96.2 |
| 4,790,618 | 12/1988 | Abe | 350/96.15 |
| 4,852,959 | 8/1989 | Werner et al. | 350/96.18 |
| 4,875,752 | 10/1989 | Suzuki | 350/96.2 |

FOREIGN PATENT DOCUMENTS

| 55-117114 | 9/1980 | Japan | 350/96.18 |
| 59-28115 | 2/1984 | Japan | 350/96.2 |

Primary Examiner—Frank Gonzalez
Assistant Examiner—John Ngo
Attorney, Agent, or Firm—William J. Simmons, Jr.

[57] ABSTRACT

The amount of light coupled to an optical fiber from a laser diode is limited to a predetermined maximum power. A lens receiving the laser output is adjusted to maximize the power received at the core portion of the fiber endface. The power coupled to the fiber is then reduced to the predetermined power level by insertion of a polarizing or absorbing filter in the optical path. When a polarizing filter is employed, it is rotated until the predetermined power is coupled to the fiber. If a quarter wave plate is included, negative effects due to back reflections from the fiber end face into the laser diode can be eliminated.

21 Claims, 3 Drawing Sheets

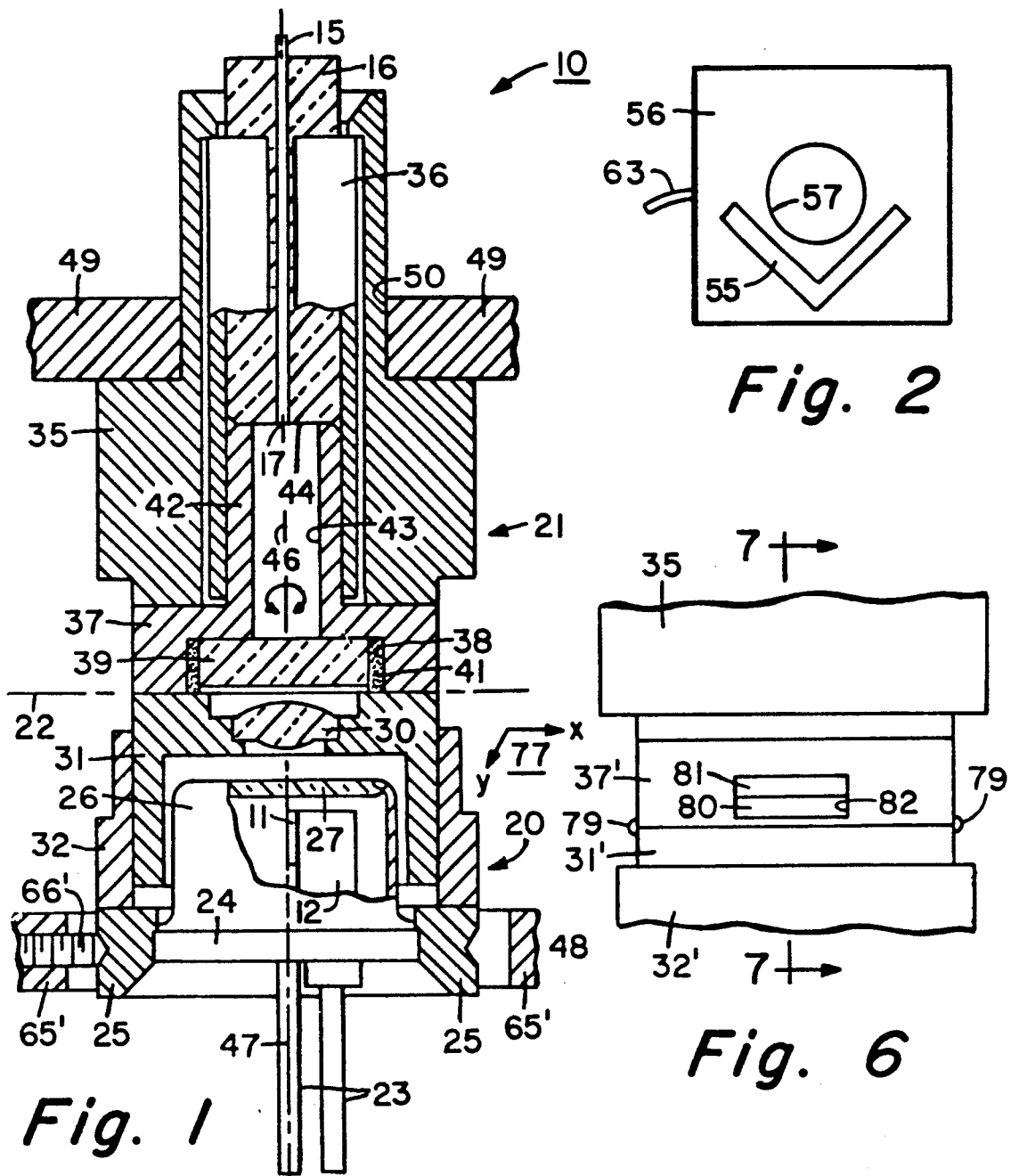
Fig. 2
Fig. 1
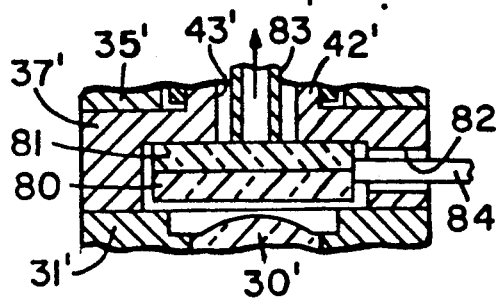
Fig. 7
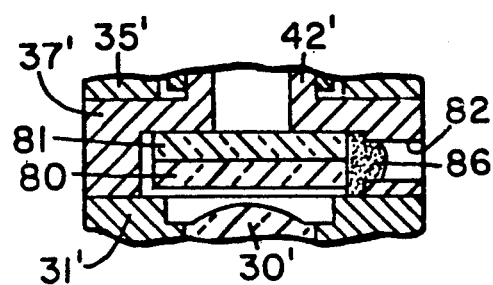
Fig. 8

METHOD OF TRIMMING OPTICAL POWER

BACKGROUND OF THE INVENTION

The present invention relates to a method of trimming the optical power and also reducing the distribution of optical power coupled from a semiconductor laser to an optical fiber or coupled to that part of a connector that is adapted to receive an optical fiber. This invention also relates to the resultant device.

When coupling light from a semiconductor laser into an optical fiber using either a bulk optic, microlens, graded index lens or the like, great variation of coupled power is observed from device to device. This may be the result of variations in laser output power, spot size, and far field pattern, as well as variations in lens throughput and laser-to-lens alignment. A system incorporating such devices must be able to operate with the range of powers that come from a distribution of devices.

In some applications, there is concern that too much light may be coupled into the fiber or, if the device is designed for use with removable fibers, that too much power may be emitted from the device when the fiber is not in place. The magnitude of acceptable powers coupled into a fiber or emitted from an unconnected device are set by national and international safety organizations. For maximum system performance, it is often important that the amount of power coupled into a fiber be as near the maximum acceptable value while not exceeding it. For a system designed to accept a number of devices, a narrow distribution of coupled powers is desirable since the system link budget is determined by the smallest coupled power within the distribution.

The amount of power emitted from the device cannot be reduced simply by decreasing the laser output power because modulated laser devices have a certain average power at which they must be operated for optimum modulation rate.

Nor is it acceptable to reduce the power coupled to a fiber by creating an angular or lateral deflection of the laser output beam axis with respect to the fiber axis so that the fiber core is no longer located at the maximum point on the laser power distribution curve. If this is done, relatively large changes of coupled power can occur in response to small misalignments which may occur as a result of welding or vibration during use, for example.

SUMMARY OF THE INVENTION

It is therefore an object of the present invention to provide a method of limiting the power coupled from a diode to a predetermined point to a level of power that does not exceed a first power level $P_1$. Furthermore, the coupled power is maintained within a narrow distribution of powers.

The method of the present invention adjusts or trims the output of a light emitting diode so that the power coupled to a predetermined point does not exceed $P_1$. The predetermined point may be the core portion of the endface of an optical fiber. A lens is positioned with respect to the diode and the point to focus light from the diode onto the point, thereby increasing to a second power level $P_2$ the power coupled from the diode to the point, wherein $P_1 > P_2$. There is placed between the diode and the point an attenuator that reduces the power coupled to the predetermined point to a level that does not exceed $P_1$.

In a preferred embodiment wherein the diode comprises a laser diode, the attenuator comprises a polarizer. The polarizer is rotated to reduce the coupled power to a level that does not exceed power level $P_1$. There is preferably employed, along with the polarizer, a quarter wave plate, the fast axis of which is oriented at 45° with respect to the transmission axis of the polarizer.

If the polarizer is fixedly mounted in a housing, the step of rotating is accomplished by rotating the housing. In another embodiment the polarizer is rotatably mounted in a housing, and the step of rotating is accomplished by rotating the polarizer within the housing.

The step of positioning the lens may comprise locating the diode on that side of the lens adjacent the object point of the lens, the optical axis of the light beam emitted by the diode being near the optical axis of the lens. The predetermined point coincides with the image point of the lens. The position of the diode is adjusted in a direction parallel to the optical axis of the lens and in a plane orthogonal to the lens optical axis to cause a maximum power to be coupled to the predetermined point. The power is then attenuated as described above.

The method of the invention results in the formation of a compact module which couples from a laser diode to an optical fiber a level of power which does not exceed power level $P_1$. The module includes polarizer means which preferably comprises the combination of a polarizer plate and a quarter wave plate. The polarizer means may be rotatably mounted in a housing having a slot through which the polarizer means can be accessed for rotation.

Various techniques can be employed for reducing reflections from the fiber endface. The polarizer means can be located such that it contacts the endface. Alternatively, the module can include a mass of index matching material between the polarizer means and endface.

BRIEF DESCRIPTION OF THE DRAWINGS

FIG. 1 is a cross-sectional view of a completed diode-optical fiber coupler package.

FIG. 2 is a front elevational view of a fixture used for preliminary alignment of a diode and lens.

FIG. 6 is a partial elevational view of a further embodiment.

FIG. 7 is a cross-sectional view taken along lines 7—7 of FIG. 6.

FIG. 8 is a partial cross-sectional view which illustrates a further step in the embodiment of FIGS. 6 and 7.

DESCRIPTION OF THE PREFERRED EMBODIMENTS

Figure 3:
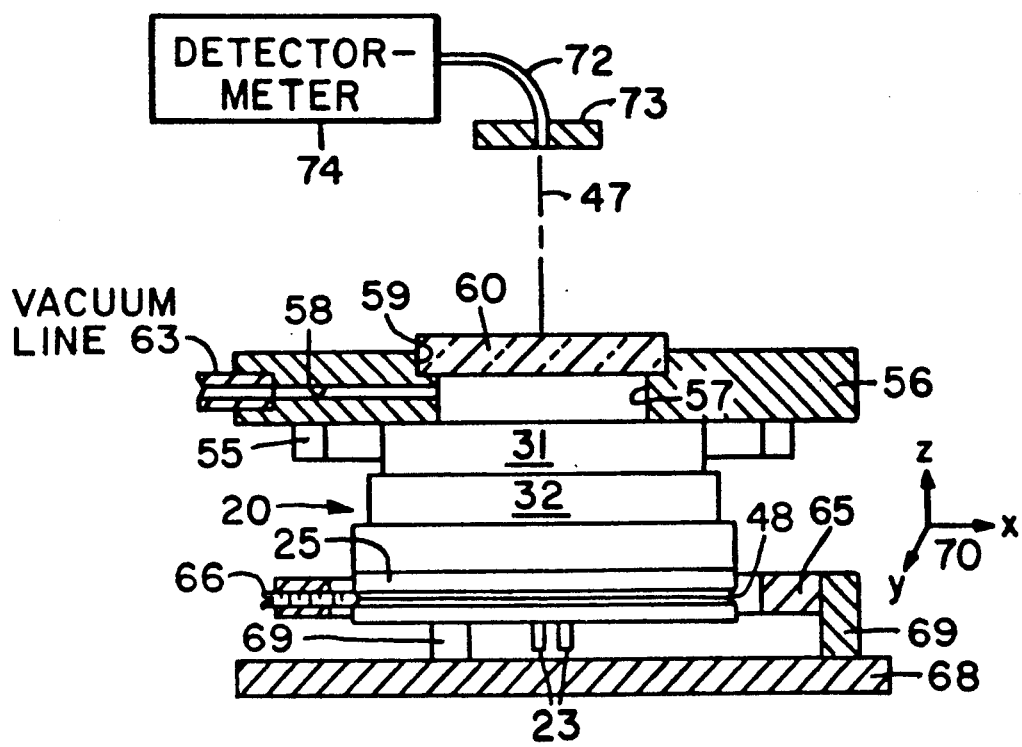
FIG. 3 is a cross-sectional view of an alignment fixture in which a diode subassembly is mounted.

The drawings are not intended to indicate scale or relative proportions of the elements shown therein.

FIG. 1 shows a completed package 10 having a laser 11 affixed to mount 12 and an optical fiber 15 feeding through a ferrule 16. Light emitted by diode 11 is focussed on the core portion of the proximal endface 17 of fiber 15. Package 10 comprises two separate subassemblies; a laser subassembly 20 and a fiber subassembly 21, the two subassemblies being joined at plane 22.

In subassembly 20, mount 12 is affixed to a header 24 that is mounted in a laser holder 25. Laser 11 is enclosed within a housing 26 having window 27 therein. Lens 30 is axially disposed within lens housing 31 that is secured to laser holder 25 by an attachment sleeve 32.

Fiber subassembly 21 comprises a fiber retainer 35 having a split sleeve 36 therein. Between retainer 35 and lens housing 31 is an attenuator housing 37 having a cavity 38 in which attenuator 39 is disposed. Alternatively, attenuator 39 could be located between lens 30 and diode 11. In a first embodiment attenuator 39 is a polarizer which may consist of any light polarizing material that can withstand the power of laser diode 11. Cylindrical protrusion 42 on housing 37 extends into split sleeve 36. The fiber endface is flush with end 44 of ferrule 16. When ferrule 16 is fully inserted into split sleeve 36 so that end 44 contacts protrusion 42, the fiber endface lies in the image plane of lens 30. Not shown are the well known fastening means for securing the fiber and/or cable to retainer 35.

The following components were employed in the method of assembly which is described below. Diode 11 was a PCO PLD-1300R-K-0097 laser diode (PCO Incorporated of Chatsworth, Calif.). The distance between the diode and fiber endface was 7.5 mm. Fiber 15 was a single-mode optical fiber. Lens 30 was designed to project light from the object plane (diode 11) to the image plane (fiber endface). The terms "object point" and "image point" are used herein to mean the points of intersection of the lens optical axis and the object and image planes, respectively. The effective focal length of lens 30 was 1.1407 mm; its back focal length (toward diode 11) was −0.0207 mm, and its front focal length (toward fiber 15) was 2.7207 mm. The object distance (toward diode 11) of lens 30 was 1.1618 mm, and the image distance thereof was 5.30713 mm. Attenuator 39 was a 1 mm thick glass polarizer of the type disclosed in U.S. Pat. No. 4,908,454.

Figure 4:
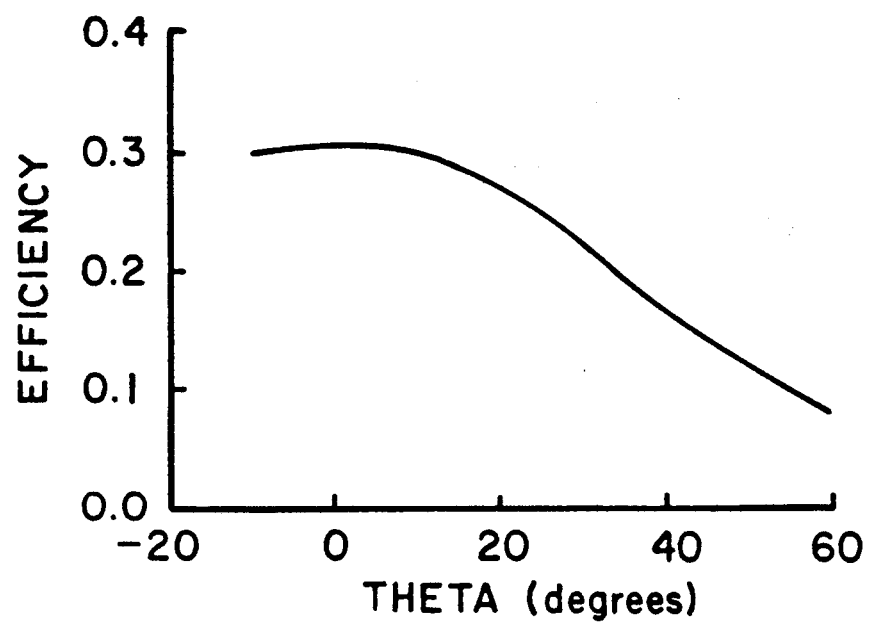
FIG. 4 is a graph wherein the relative amount of plane polarized light coupled from a polarizer into an optical fiber is plotted as a function of the angle of the polarizer transmission axis with respect to the direction of polarization of the light.

Referring to FIGS. 2 and 3, subassembly 20 is initially assembled by placing lens housing 31 in V-groove support 55 located on the front face of vacuum housing 56. Vacuum line 63 is connected to aperture 57 by bore 58. The vacuum within aperture 57 holds lens housing 31 against the front face. Recess 59 in the back face of housing 56 receives an attenuator 60. To form the device of FIG. 1, attenuator 60 comprises a polarizer which may be marked to indicate the direction of the transmission axis. Laser holder 25 is mounted in annular support fixture 65 by advancing three equally spaced screws 66 into groove 48. Groove 48 could be replaced by three indents that are spaced 120° around the circumference of holder 25. Fixture 65 is attached by support brackets 69 to micromanipulator 68 that is capable of moving along x-y-z axes 70. A mark on the laser holder is oriented with respect to the mark on the polarizer to roughly align the plane of the polarized laser light with the transmission axis of the polarizer, so that nearly full diode output power is transmitted by the polarizer. Since laser diode 11 emits polarized light, rotation of polarizer 60 can decrease the power coupled to fiber 72 from full diode output power to some lower power level as illustrated by FIG. 4. The efficiency is the ratio of the power coupled into the single-mode optical fiber divided by the power emitted by the laser diode. It is noted that a maximum of about 30% of the light from the laser diode is coupled to the fiber.

Optical fiber 72 is supported by means 73 such that the proximal endface thereof is located the same distance from the front face of housing 56 as endface 17 is located from plane 22 in which the face of housing 31 lies (FIG. 1). The core portion of the endface of fiber 72 is located on the axis of lens 30 after lens housing 31 has been mounted in V-groove support 55. The distal end of fiber 72 is coupled to detector/meter 74 which permits the power coupled to the proximal end of the fiber to be monitored.

The optical axis 47 of laser 11 is within some predetermined distance of the longitudinal axis of disc-shaped header 24. For example, the light emitted by the aforementioned PCO laser diode is within about 0.007 inch (0.18 mm) of the header axis. When header 24 is bonded to laser holder 25, the diode optical axis is near the longitudinal axis of holder 25. Therefore, light emitted by diode 11 initiates light propagation in fiber 15.

An electrical connector (not shown) is attached to terminals 23 to energize diode 11. Manipulator 68 is used to translate diode 11 along x, y and z axes 70 to maximize power coupled to fiber 72. With the end of sleeve 32 in contact with laser holder 25, the sleeve is bonded to lens housing 31 and to laser holder 25. Bonding of the various elements can be accomplished by laser welding, soldering, epoxy and the like. If sleeve 32 is laser welded to housing 31, the weld can be made at the thin-walled region of the sleeve.

Fiber subassembly 21 (FIG. 1) is assembled as follows. Polarizer 39 is placed into cavity 38 with its transmission axis aligned with a mark on housing 37, and it is secured in the housing by a bonding material 41 such as epoxy. Split sleeve 36 is placed in retainer 35, and protrusion 42 is inserted into split sleeve 36. The resultant assembly is inserted into assembly fixture 49, and the combination of fiber 15 and ferrule 16 is inserted. The distal end of fiber 15 is coupled to a detector (not shown) which permits the monitoring of the power coupled into the fiber at the proximal end thereof.

Figure 5:
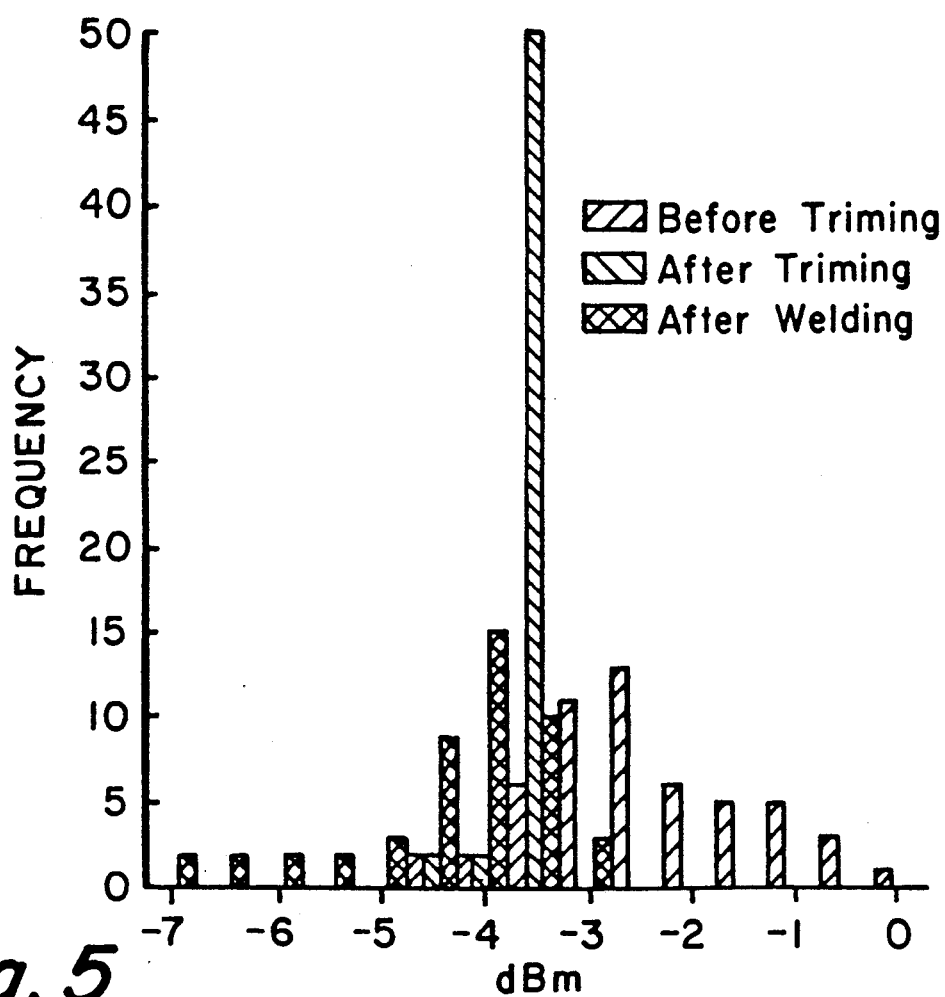
FIG. 5 is a bar graph illustrating the power distribution of coupled laser diode light during three stages of assembly.

Subassembly 20 is mounted in support fixture 65' that is associated with a micromanipulator (not shown). The front face of lens housing 31 is moved into contact with and in approximate axial alignment with attenuator housing 37 as shown in FIG. 1. A mark on lens housing 31 is aligned with the mark on attenuator housing 37 so that substantially full diode power is transmitted by polarizer 39. This power level is usually sufficiently great that it will result, after final axial alignment, in the coupling of a power level $P_2$ to fiber 15, wherein $P_2$ is greater than $P_1$. Diode 11 is translated along x-y axes 77 to maximize to level $P_2$ the power coupled to fiber 15. The less critical z-axis alignment had been previously made in the apparatus of FIG. 3. The "before trimming" bars of the graph of FIG. 5 represent the distribution of power coupled to the fiber in 54 devices after this alignment step.

Polarizer 39 is then rotated to limit the coupled power to the maximum predetermined level $P_1$, which was 432 mw in a specific example. This can be accomplished by rotating the entire fiber subassembly 21 about axis 46 as shown by the double-headed arrow. FIG. 5 indicates that "after trimming", the distribution of coupled powers in the tested devices was much tighter, standard deviation improving from 1.00 dB to 0.19 dB.

After the power has been reduced to $P_1$, attenuator housing 37 and lens housing 31 are secured together by suitable means such as laser welding of their peripheral region of contact. If elements 31 and 37 are to be joined by welding, it is preferred that they be separated by about 10 μm before welding to minimize the relative differences of weld thicknesses. The distribution of coupled powers after this final welding operation is represented in FIG. 5 as "after welding". With no trimming, the after welding distribution would be expected to be wider than the before trimming distribution. However, this technique reduces the standard deviation in coupled power from 1.00 dB to 0.71 dB.

The remaining distribution is primarily caused by the final weld and may be removed by performing the final polarizer rotation after welding. This embodiment is illustrated in FIGS. 6, 7 and 8 wherein elements similar to those of FIG. 1 are represented by primed reference numerals.

In that embodiment wherein the attenuator is a polarizer, it is preferred that a quarter-wave plate also be employed to eliminate back reflections from the fiber endface. The combined optical path lengths of the polarizer and quarter wave plate must be taken into account when designing the device.

In the embodiment of FIGS. 6, 7 and 8, the fast axis of quarter wave plate 81 is oriented at 45° with respect to the transmission axis of polarizer 80, and the two are secured together at the peripheries thereof by suitable bonding material (not shown). The slight separation between polarizer 80 and lens housing 31' illustrates the fact that the attenuator comprising the polarizer and quarter wave plate has sufficient clearance that it can be easily rotated.

After attenuator housing 37' is joined to lens housing 31' by welds 79, polarizer 80 can be rotated by removing ferrule 16 and inserting a tube 83 into cavity 43' until it contacts plate 81. Since tube 83 is connected to a vacuum source, it adheres sufficiently to plate 81 that the polarizer/plate combination can be rotated thereby. After making a small angular adjustment, tube 81 is removed and the fiber containing ferrule reinserted so that power coupled to the fiber can be measured. The rotational adjustment is repeated until the predetermined maximum amount of power is coupled to the fiber.

Alternatively, the polarizer can be rotated by inserting adjustment rod 84 into slot 82 and moving the rod along the slot. At least the tip of the rod can be formed of a material that enhances the frictional engagement of the polarizer by the rod. The use of rod 84 permits the continual monitoring of power coupled to the fiber while adjustment is being made.

After the polarizer has been rotated to limit the coupled power to the predetermined maximum level, it can be secured in that angular orientation by applying a bonding material 86. Alternatively, a previously applied bonding material could be cured after the polarizer has been oriented.

In another embodiment of the invention, polarizer 39 is replaced by a light absorbing glass disc. For a particular application, there is maintained a predetermined number of types of discs, each type having a specific optical density. The variation in optical density can be accomplished without significantly affecting the optical path length that results from the filter by varying the concentration of absorbing dopant in the glass while leaving the thickness constant. After the power coupled to fiber 15 is peaked, and the laser subassembly is completed, that type of disc is selected which will reduce the coupled light to a value most closely approximating the desired output value. That disc is secured in cavity 38, and attenuator housing 37 is attached to lens housing 31 as described above.

Figure 9:
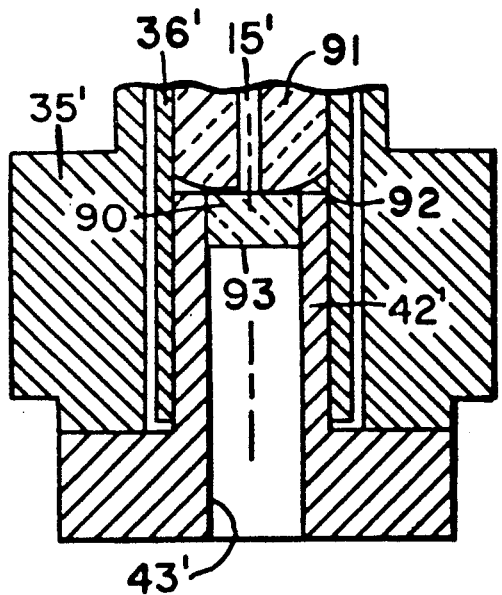
FIGS. 9 and 10 are partial cross-sectional views of further embodiments.
Figure 10:
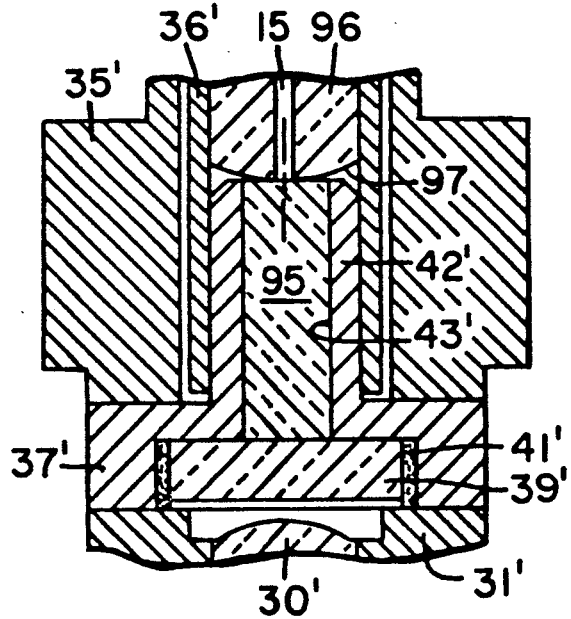

Further embodiments are illustrated in FIGS. 9 and 10 wherein elements similar to those of FIG. 1 are represented by primed reference numerals. In FIG. 9, reflections from the proximal endface of fiber 15' are reduced by locating attenuator 90 in that end of protrusion cavity 43' immediately adjacent that endface. Reflections could be further reduced by applying an antireflective coating to the proximal end of the attenuator. To ensure intimate contact between the fiber and attenuator, end 92 of ferrule 91 is rounded. Since attenuator surface 93 is spaced from the image plane of the lens, a reduced amount of the light reflected from that surface propagates back to the laser diode.

Another technique for reducing reflections is shown in FIG. 10 wherein the entire cavity 43' is filled with an index matching cylinder 95 having substantially the same refractive index as fiber 15'. If cylinder 95 is formed of a glass such as silica, the end of ferrule 96 should be rounded to enable the endface of fiber 15' to make intimate contact with the cylinder.

Ferrule 96 would not need to be rounded if cylinder 95 were formed of a transparent resilient material which extended to the end of protrusion 42' and made contact with the fiber endface. Materials such as epoxies, acrylics, polyesters, polycarbonates and the like can be employed. Such a material could be applied as a liquid and then cured by subjecting it to heat.

Additional techniques for reducing reflections from the fiber endface are disclosed in U.S. Pat. No. 4,790,618 to Y. Abe.

We claim:
1. A method of coupling from a polarized light emitting laser diode to a predetermined point a level of power that does not exceed a first power level, said method comprising
   positioning lens means with respect to said diode and said predetermined point to focus light from said diode onto said predetermined point, thereby maximizing to a second power level the power coupled from said diode to said predetermined point, said second power level being greater than said first power level,
   placing between said diode and said predetermined point a polarizer that is capable of attenuating the power of the diode light depending on the angle of orientation of the transmission axis of said polarizer with respect to the angle of polarization of said polarized light, said lens means being mounted in a first housing and said polarizer being rotatable mounted in a second housing, said diode, lens and polarizer orientation being initially positioned to cause the power coupled to said point to exceed said first power level,
   welding together said housings, and thereafter,
   rotating said polarizer to reduce the power coupled to said predetermined point to a level substantially equal to said first power level.
2. A method of coupling from a polarized light emitting laser diode to a predetermined point a level of power that does not exceed a first power level, said method comprising positioning lens means with respect to said diode and said predetermined point to focus light from said diode onto said predetermined point, thereby maximizing to a second power level the power coupled from said diode to said predetermined point, said second power level being greater than said first power level, placing between said diode and said predetermined point a polarizer that is capable of attenuating the power of the diode light depending on the angle of orientation of the transmission axis of said polarizer with respect to the angle of polarization of said polarized light, and rotating said polarizer to reduce the power coupled to said predetermined point to a level that does not exceed said first power level.

3. A method in accordance with claim 2 wherein the step of placing comprises placing between said diode and said predetermined point a polarizer and a quarter wave plate, the fast axis of said quarter wave plate being oriented at 45° with respect to the transmission axis of said polarizer.

4. A method in accordance with claim 2 wherein said polarizer is fixedly mounted in a housing, the step of rotating being accomplished by rotating said housing.

5. A method in accordance with claim 2 wherein said polarizer is rotatably mounted in a housing, the step of rotating being accomplished by rotating said polarizer within said housing.

6. A method in accordance with claim 5 wherein the step of rotating comprises placing an end of a tube in contact with one surface of said polarizer, evacuating said tube, and rotating said tube.

7. A method in accordance with claim 5 wherein the said polarizer is rotatably mounted in a housing having a slot extending to a peripheral surface of said polarizer, and wherein the step of rotating comprises inserting adjustment means through said slot and moving said adjustment means.

8. A method in accordance with claim 2 wherein the step of positioning said lens means comprises locating said diode on that side of said lens means adjacent the object point of said lens means, the optical axis of the light beam emitted by said diode being near the optical axis of said lens means, said predetermined point coinciding with the image point of said lens means, and adjusting the position of said diode in a direction parallel to the optical axis of said lens means and in a plane orthogonal to said lens means optical axis to cause a maximum power to be coupled to said predetermined point.

9. A method in accordance with claim 8 wherein said predetermined point is the core portion of the endface of an optical fiber.

10. A method in accordance with claim 8 wherein said diode is a laser diode.

11. A method of coupling from a laser diode to an optical fiber a level of power that does not exceed a first power level comprising providing an optical fiber having an endface, positioning lens means between said diode and said endface, positioning a polarizer between said diode and said endface, rotating said polarizer to obtain maximum light transmission therethrough, adjusting the position of said lens means and said diode to focus light from said diode onto said endface, thereby maximizing to a second power level the power coupled to said fiber, said second power level being greater than said first power level, and rotating said polarizer to reduce the power coupled to said fiber to a level that is substantially equal to said first power level.

12. A method in accordance with claim 11 wherein the step of positioning comprises positioning said lens means with respect to said diode and endface so that said endface is located in the vicinity of the object point of said lens means and said diode is located in the vicinity of the image focal point of said lens means.

13. A method in accordance with claim 12 wherein said lens means is mounted in a first housing and said polarizer is mounted in a second housing, said method further comprising the step of welding together said housings, and thereafter, performing the step of rotating said polarizer.

14. A module for coupling from a laser diode to an optical fiber a level of power that does not exceed a first power level comprising a laser diode capable of emitting plane polarized light at an output level sufficient to cause the coupling of light to said fiber at a power level greater than said first level, a lens positioned between said laser and the endface of said fiber for focusing light emitted by said laser onto said fiber endface, the axis of said fiber being substantially coincident with the optical axis of said lens, and polarizer means positioned between said lens and said fiber, the angular orientation of said polarizer means transmission axis with respect to the plane of polarization of said polarized light being such that, when said laser is energized to emit light at said output level, the power of the light coupled to said fiber does not exceed said first power level.

15. A module in accordance with claim 14 wherein said polarizer means includes a quarter wave plate.

16. A module in accordance with claim 14 wherein said polarizer means contacts said fiber endface.

17. A module in accordance with claim 14 further comprising a mass of index matching material between said polarizer means and said fiber endface.

18. A module in accordance with claim 14 wherein said polarizer means is rotatably mounted in a housing, said housing having a slot extending to a peripheral surface of said polarizer means, whereby said polarizer means can be accessed for rotation through said slot.

19. A method of coupling from a polarized light emitting laser diode to the core portion of the endface of an optical fiber, a level of power that does not exceed a first power level, said method comprising positioning said diode on that side of a lens adjacent the object point of said lens, the optical axis of the light beam emitted by said diode being near the optical axis of said lens, said predetermined point coincinding with the image point of said lens, adjusting the position of said diode in a direction parallel to said lens optical axis and in a plane orthogonal to said lens optical axis to maximize to a second power level the power coupled to said predetermined point, said second power level being greater than said first power level, placing between said lens and said core portion of said endface a polarizer that is capable of attenuating the power of the diode light depending on the angle of orientation of the transmission axis of said polarizer with respect to the angle of polarization of said polarized light, and rotating said polarizer to reduce the power coupled to said optical fiber endface to a level that does not exceed said first power level.

20. A method in accordance with claim 19 wherein said polarizer is fixedly mounted in a housing, the step of rotating being accomplished by rotating said housing.

21. A method in accordance with claim 19 wherein said polarizer is rotatably mounted in a housing, the step of rotating being accomplished by rotating said polarizer within said housing.

* * * * *